United States Patent
Brookshire et al.

(10) Patent No.: US 6,698,717 B1
(45) Date of Patent: Mar. 2, 2004

(54) MODIFIED BUTTERFLY VALVE AND ASSEMBLY

(75) Inventors: Dennis L. Brookshire, Bolingbrook, IL (US); Kristian N. Dullack, Carson, CA (US); Christopher C. Greentree, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/280,885

(22) Filed: Oct. 24, 2002

(51) Int. Cl.[7] ............................ F16K 1/22; F16K 1/226
(52) U.S. Cl. ........................................ 251/305; 251/308
(58) Field of Search ................................. 251/305–308

(56) References Cited

U.S. PATENT DOCUMENTS

| | | | | |
|---|---|---|---|---|
| 4,105,040 A | * | 8/1978 | Chester | 251/306 |
| 4,266,753 A | * | 5/1981 | Okada | 251/305 |
| 4,605,201 A | * | 8/1986 | Miyazaki | 251/305 |
| 4,796,857 A | * | 1/1989 | Hayes | 251/306 |
| 5,315,975 A | * | 5/1994 | Hattori et al. | 251/305 |
| 5,465,696 A | * | 11/1995 | Gmelin | 251/305 |
| 5,979,871 A | * | 11/1999 | Forbes et al. | 251/305 |
| 6,186,115 B1 | * | 2/2001 | Nishimura et al. | 251/305 |
| 6,273,119 B1 | * | 8/2001 | Foster et al. | 251/305 |
| 6,338,467 B1 | * | 1/2002 | Mabboux et al. | 251/305 |

\* cited by examiner

*Primary Examiner*—Paul J. Hirsch
(74) *Attorney, Agent, or Firm*—Ephraim Starr; Brian Pangrle

(57) ABSTRACT

Butterfly valves of this invention generally comprise a flapper element that is rotatably disposed within an annular bore of a valve housing. The valve may be configured to provide an improved degree of gas flow control sensitivity from a closed to a partially opened position through the use of projections that extend radially inwardly from the housing bore, are positioned at diametrically opposed positions within the bore, and that are specifically configured to provide a gradual increase in gas flow across the valve as the flapper is moved from a closed position to a partially opened position. The butterfly valve may be configured having further projections that extend radially inwardly a distance therein, that are positioned at diametrically opposed positions in the bore, and that include faces that are sized and shaped to cooperate with respective opposed surfaces of the flapper to seal off gas flow within the bore when the flapper is placed into a closed position. The butterfly valve may also be configured having a bushing that surrounds a shaft that is mounted to the flapper. The shaft extends through the housing and is coupled to an arm outside of the housing. The bushing and arm are configured having complementary surfaces to provide a seal therebetween that functions to minimize or eliminate the unwanted leakage of gas from the valve.

6 Claims, 14 Drawing Sheets

MODIFIED BUTTERFLY VALVE AND ASSEMBLY

FIELD OF THE INVENTION

The present invention relates to exhaust gas transport devices and systems as used with internal combustion engines and, more particularly, to improved butterfly valves and related butterfly valve assemblies as used in a vehicle exhaust gas recirculation system.

BACKGROUND OF THE INVENTION

EGR systems are designed to recirculate exhaust gas generated by an internal combustion engine back into an engine intake stream. Since the exhaust gas exiting the engine is already combusted, it does not combust or burn again when it is recirculated into the combustion chamber, thereby acting to displace some of the normal intake charge. The effect of adding such exhaust gas to the intake charge operates to chemically slow and cool the combustion process by several hundred degrees, thereby acting to reduce NOx formation.

For this reason, EGR systems have gained widespread acceptance and application for use with many different types of internal combustion engines. In order to use an EGR system, a valve must be used to control the flow of exhaust to the intake charge. It is desirable to use a butterfly valve in such an EGR system, and the use of butterfly valves in EGR systems are known. However, EGR systems comprising traditional butterfly valves are not without problems that must be overcome.

For example, typical butterfly valves are disposed within a circular valve housing having a constant diameter, i.e., having a straight-bore geometry. The use of a butterfly valve with such a straight-bore geometry housing provides a flow characteristic (from a device near constant upstream pressure and a variable downstream pressure such as a diesel engine) that is non-linear relative to the positioning of the valve, i.e., with a decreasing positive sloped pressure curve. In this traditional butterfly valve assembly a greater percentage of flow across the valve is achieved within the first 30 percent of opening of the valve than 30 percent flow. In fact, as the valve is opened the remaining amount of the way from the 30 percent position (i.e., from 30 to 95 percent), there is not as much increase in the flow (i.e., there is not a corresponding 65 percent increase in flow).

Thus, the use of such traditional butterfly valve assemblies in EGR service do not provide a high degree of flow control sensitivity at the just-opened valve position. For use in EGR system service, however, there is a need for a butterfly valve assembly that is capable of providing an improved degree of flow control sensitivity near the closed valve position.

Additionally, the use of traditional butterfly valves and valve assemblies in EGR systems oftentimes do not provide a high degree of sealing at the level of precision that is required for an EGR Valve application. For example, a typical butterfly valve in such service does not have a full 90 degrees of motion, and the sealing surface of such valve is positioned between an outer edge of the valve flapper and the wall of a bore (or valve housing) within which the valve is situated. The undesired leakage of such traditional butterfly valves placed into EGR service is a key factor in producing particulate emissions associated with a diesel engine. There is, therefore, a need for a butterfly valve and assembly that is designed in such manner so as to provide an improved internal seal (i.e., a seal between the valve and a valve seat) when placed into a closed position, thereby reducing leakage thereby to help control/reduce particulate emissions.

Additionally, it is known that traditional butterfly valves placed into EGR system service tend to produce an unwanted heavy soot buildup on adjacent hardware, such as an engine block, water pump, oil cooler, turbocharger, etc. This heavy soot buildup is caused by the external leakage of high pressure (pre-turbine) exhaust gas from the valve to outside atmosphere. Such external leakage of exhaust gas from the butterfly valve often occurs through the valve assembly controlling the valve inside of the bore. There is, therefore, a need for a butterfly valve and valve assembly that is designed to reduces the potential for external leakage of high pressure exhaust gas therefrom and to the atmosphere.

SUMMARY OF THE INVENTION

Butterfly valves and related valve assemblies/housings, constructed according to the practice of this invention, to address that above-identified needs generally comprise a flapper element that is rotatably disposed within an annular bore of a valve housing. The valve may be configured to provide an improved degree of gas flow control sensitivity from a closed to a partially opened position through the use of projections that extend radially inwardly from the housing bore, are positioned at diametrically opposed positions within the bore, and that are specifically configured to provide a gradual increase in gas flow across the valve as the flapper is moved from a closed position to a partially opened position.

In another embodiment, the butterfly valve is configured to provide an improved internal seal when placed in a closed position to reduce or eliminate the unwanted passage of exhaust gas therethrough. In such embodiment, the butterfly valve is configured with the valve housing having projections that extend radially inwardly a distance therein, that are positioned at diametrically opposed positions in the bore, and that include faces that are sized and shaped to cooperate with respective opposed surfaces of the flapper to seal off gas flow within the bore when the flapper is placed into a closed position.

In still another embodiment, the butterfly valve is configured to provide an improved seal to control leakage of exhaust gas from the valve to the external environment. In such embodiment, the butterfly valve is configured comprising a flapper that is positioned on a shaft extending through the housing. A bushing surrounds the shaft, is interposed between the shaft and the housing, and extends outwardly from the housing. The shaft is coupled to an arm outside of the housing. The bushing and arm are configured having complementary surfaces to provide a seal therebetween that functions to minimize or eliminate the unwanted leakage of gas from the valve.

BRIEF DESCRIPTION OF THE DRAWINGS

The aspects of the present invention are more readily understood when considered in conjunction with the accompanying drawings and the following detailed description wherein.

DETAILED DESCRIPTION OF THE INVENTION

Butterfly valves and valve assemblies are constructed according to principles of this invention for use in exhaust gas recirculation (EGR) systems, as used with internal combustion engines, e.g., conventional and/or turbocharged gasoline and/or diesel engines. Butterfly valves and valve assemblies of this invention are specially configured to provide an improved degree of flow control sensitivity near the just-opened valve position, to provide an improved degree of internal sealing (between the valve member and valve seat), and to reduce or eliminate undesired leakage of exhaust gas from the valve and/or valve assembly to the external environment/atmosphere.

Butterfly valves and valve assemblies of this invention are intended to be used with turbocharged or non-turbocharged gasoline and/or diesel powered internal combustion engines.

Figure 1:
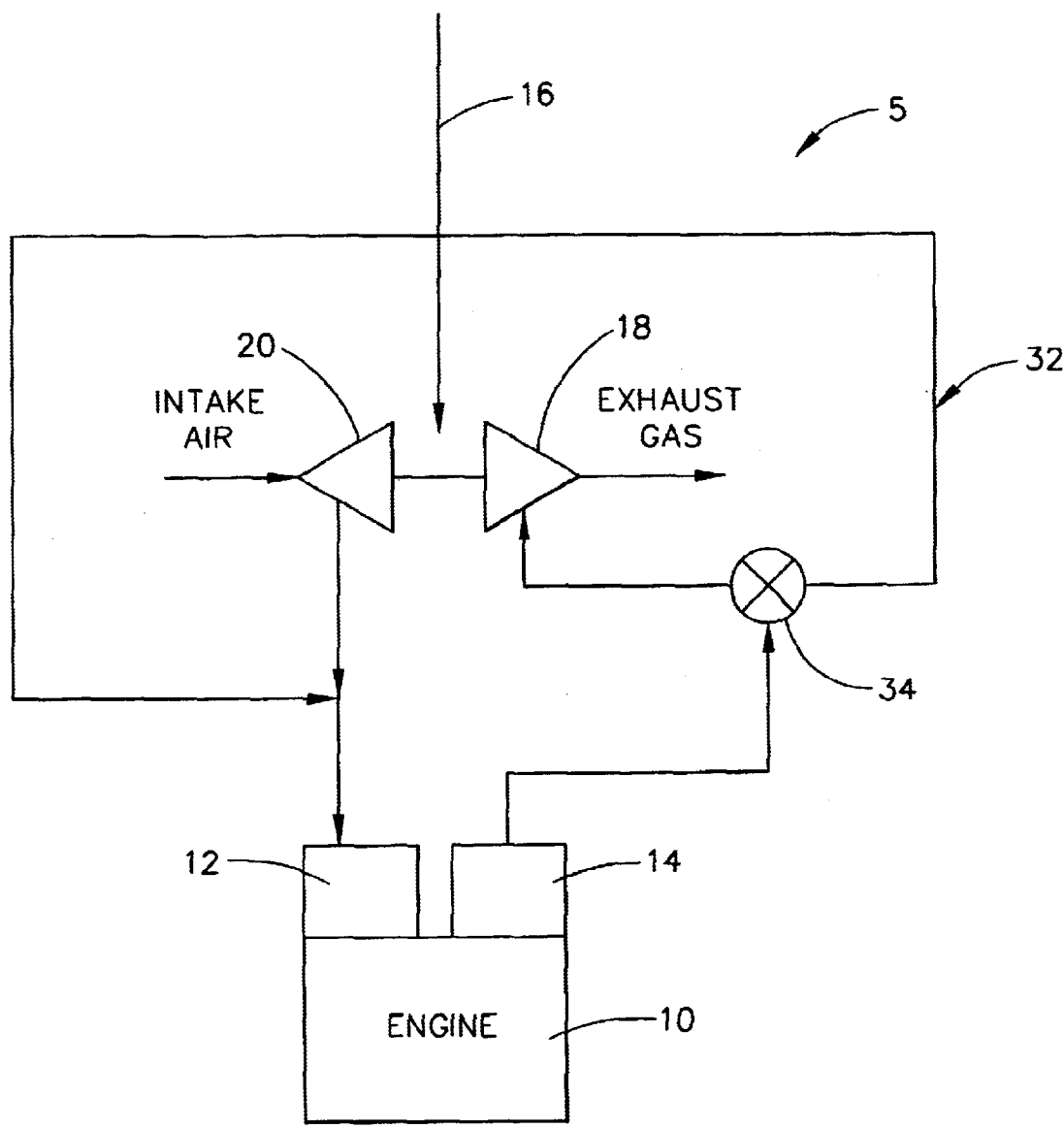
FIG. 1 is a schematic diagram of an internal combustion engine system having a turbocharger and an EGR system.

FIG. 1 illustrates a conventional turbocharged internal combustion engine system 5 comprising an engine 10 having an intake manifold 12 and an exhaust manifold 14. In the illustrated embodiment, the engine includes a turbocharger 16, generally comprising a turbine 18 (for receiving exhaust gas from the engine exhaust manifold) and a compressor 20 (for receiving and compressing intake air before being routed for combustion in the engine).

The engine 10 also includes an EGR system, generally designated as 32. The EGR system includes an EGR control valve 34 that is interposed between the turbocharger 16 and the engine 10 and connected therebetween by suitable piping and/or manifolding. The EGR 34 valve operates to receive and regulate the proportion of exhaust gas that is taken from the exhaust manifold and either returned to the engine induction system for mixing with the intake air or directed to the turbine of the turbocharger. The EGR valve comprises a butterfly valve and valve assembly as constructed according to principles of this invention that are discussed in detail below.

Butterfly valves and valve assemblies, constructed according to an embodiment of this invention, are configured for use in EGR situations calling for an improved degree of flow control sensitivity near the closed position of the valve. Such improved degree of flow control sensitivity has been achieved by modifying the opening geometry of a bore, within which the butterfly valve is disposed, with a formed feature. Such modified opening geometry enables the flow characteristic of the valve to be changed to provide a more controlled opening when used with devices that provide near constant pressure upstream and variable pressure downstream, such as when placed within the pre-turbine exhaust stream.

Figure 2:
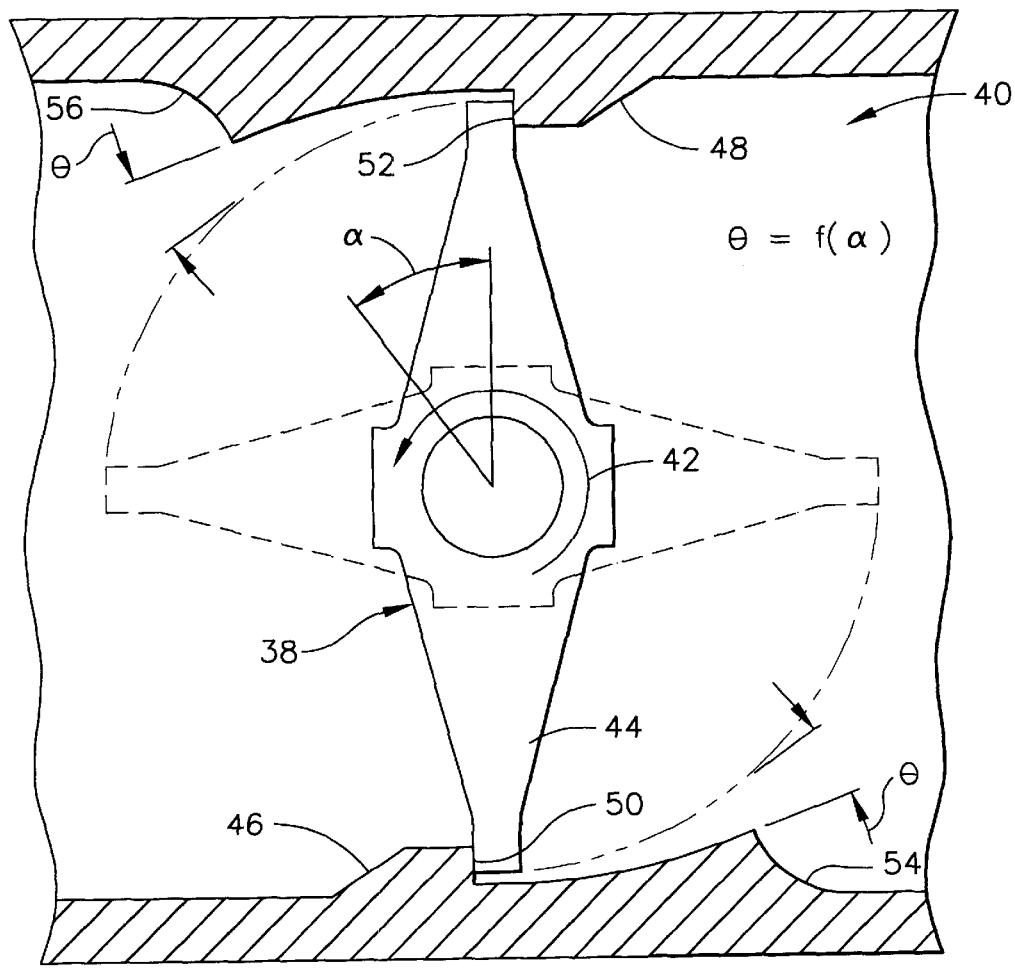
FIG. 2 is a cross sectional side view of a butterfly valve, and bore taken along a flow axis, constructed according to an embodiment of the present invention.

FIG. 2 shows a butterfly valve 38 situated in a valve housing bore 40, each constructed according to an embodiment of the present invention. The butterfly valve 38 comprises a shaft 42 running diametrically thereacross, that is provided for purposes of activating the valve. The valve includes a generally circular flapper 44 that extends radially outwardly from the shaft 42, and that is sized and shaped to fit within the housing or bore 40. When the valve 38 is placed in a closed position, the flapper 44 is positioned perpendicular to a direction of exhaust gas flow, to close and block off the flow of exhaust gas traveling through the bore 40. When the valve 38 is placed in an open position, the flapper 44 is positioned parallel to the direction of flow of exhaust gas traveling through the bore 40.

As shown in FIG. 2, the bore 40 includes an inside diameter surface that is configured (by suitable molding or machining process) having a number of projections extending radially inwardly into the bore and positioned adjacent the valve. In an example embodiment, the projections can have a generally semi-circular configuration (i.e., extend circumferentially half way around the bore), and there may exist four such projections. First and second projections 46, 48 are positioned at diametrically opposed positions in the bore to stop/limit the rotation of the valve to provide a closed position by blocking the path of the flapper 44 when the flapper 44 nears a position substantially perpendicular to the direction of flow of exhaust gas.

The first and second projections 46, 48 each include a face or surface 50, 52 that is positioned perpendicular to the direction of exhaust gas flow. Each such projection face 50, 52 functions to contact respective adjacent surfaces of the flapper 44 when the valve is rotated into a closed position. The first and second projections include a gradually sloped surface, moving axially away from each respective face 50, 52 back toward a wall of the bore, that functions to minimize unwanted gas flow effects thereacross.

Third and fourth projections 54, 56 are located upstream and downstream of the valve 38, respectively, a discrete distance away from the valve flapper and are configured so as to provide a defined gas flow path between a terminal edge of the flapper and the bore as the flapper is moved away from the first and second projection faces. The second and third projections are shaped, moving along the gas flow axis and away from each respective diametrically opposed flapper edge, having an outside surface that gradually increases in radial height, that comes to a peak at an approximate midpoint of each projection, and that 5 gradually decreases in radial height moving away from the peak. The third and fourth projections are shaped and sized to provide a gradually increasing flow path between the flapper edge and bore as the flapper is moved from its closed position.

When the valve flapper is in a closed position, a first angle α (which is the angle the flapper is from a position perpendicular to the direction of exhaust gas flow) is equal to 0. An angle θ is measured from an outer edge of the flapper 44 to an adjacent surface along the third and fourth projections 54, 56. The angle θ is a function of both the flapper position and the shape of the third and fourth projection, which can be modified as needed to accommodate specific flow control parameters for each different EGR valve application. Generally speaking, the third and fourth projections are configured having a gradually tapered outside surface to provide an angle θ that increases gradually with increasing valve opening movement away from the closed position.

Figure 3:
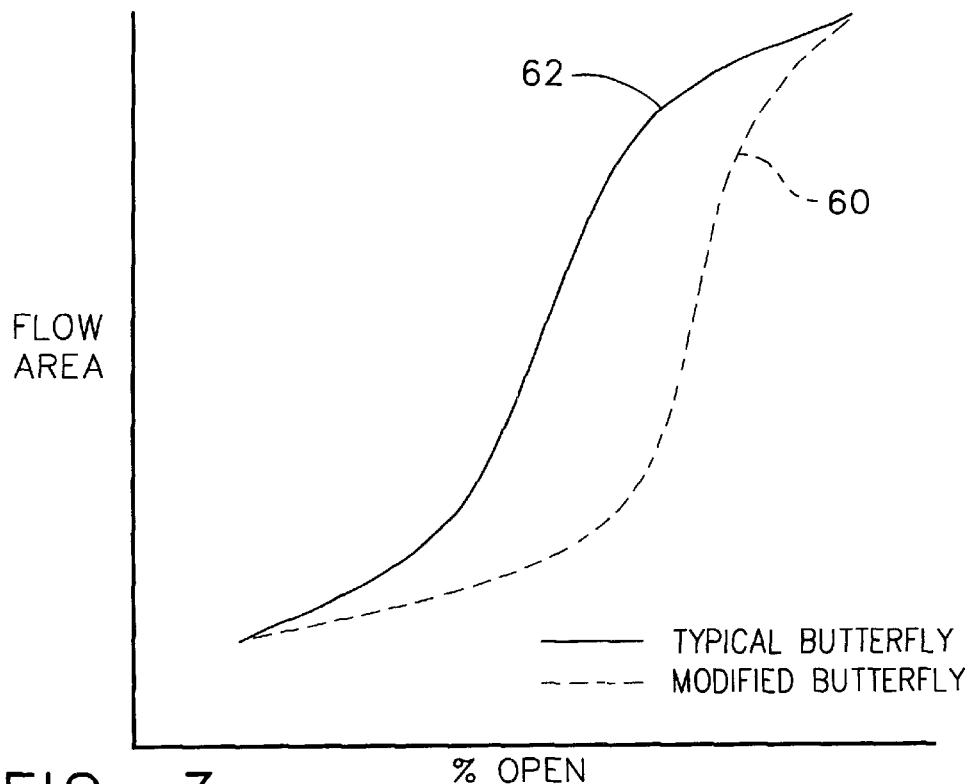
FIG. 3 is a graph illustrating comparative butterfly valve gas flow characteristics as a function of flow area and percentage of valve opening for butterfly valves prepared according to an embodiment of the present invention v. traditional butterfly valves.

FIG. 3 sets forth a graph that illustrates the different gas flow characteristics, as a function of flow area (between the butterfly valve flapper and bore) and percent open, for a typical butterfly valve and valve housing vs. a butterfly valve and valve housing constructed according to this invention comprising the modified housing bore. As demonstrated by the graph, the change in flow area as a function of percent valve openness (line 60) for a butterfly valve and housing of this invention is much more gradual than that of a traditional butterfly valve and housing (line 62). The gradual increase in flow area as a function of percentage valve openness provides a desired degree of improved flow control sensitivity near the just opened valve position.

Figure 4:
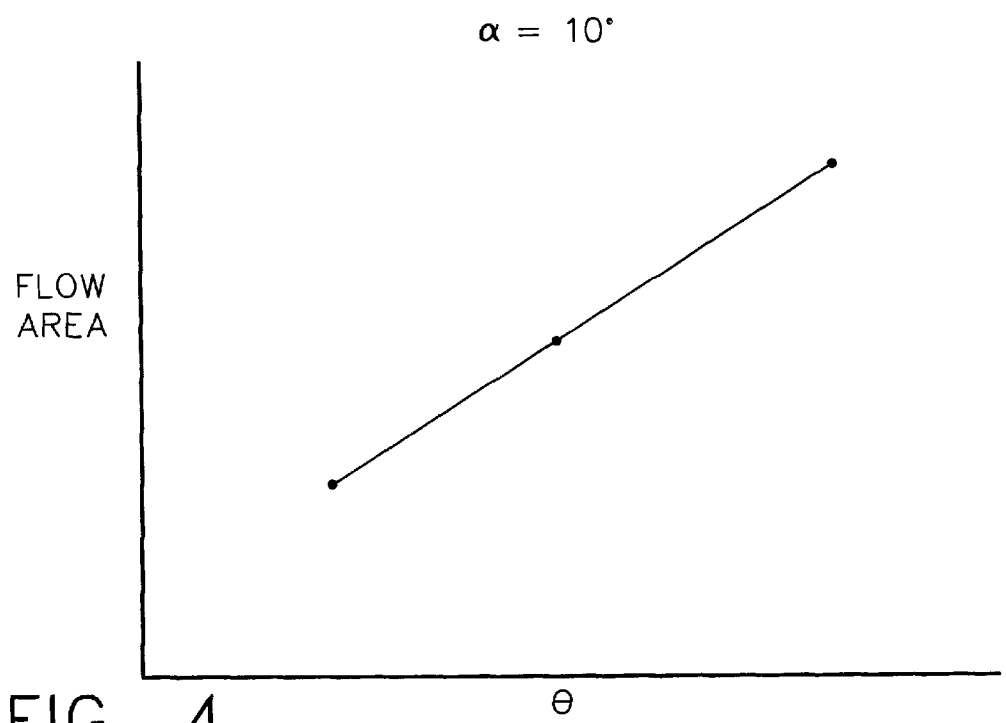
FIG. 4 is a graph illustrating the difference in flow area as a function of a (degree of valve opening) for butterfly valves constructed according to an embodiment of the present invention.
Figure 5:
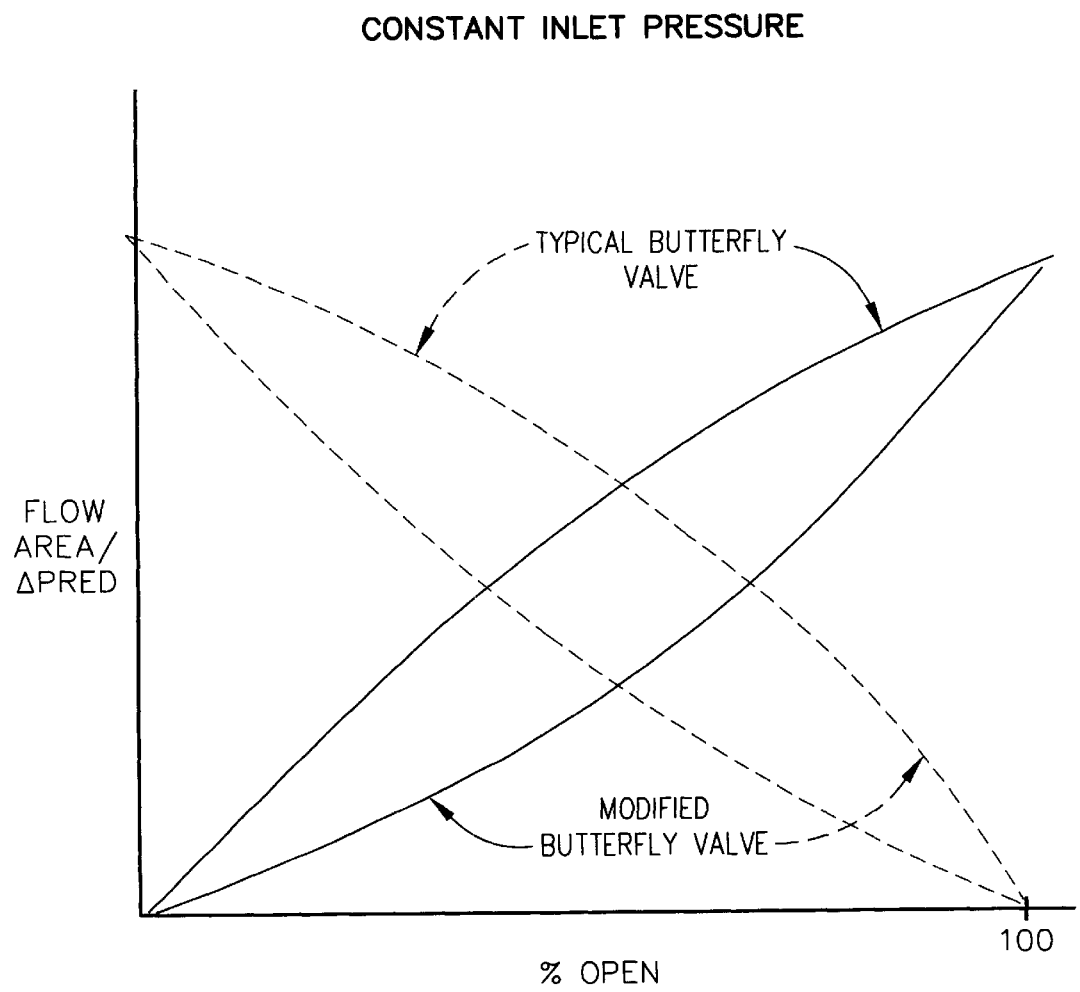
FIG. 5 is a graph illustrating comparative butterfly valve gas flow characteristics as a function of flow area and percent valve opening for butterfly valves of this invention v. traditional butterfly valves.

FIG. 4 sets forth a graph illustrating an approximately linear relationship between the gas flow area and the angle θ for a butterfly valve (fixed at α=10 percent) and valve housing/assembly constructed according to an embodiment of the present invention. This essentially linear relationship functions to provide the desired degree of flow control sensitivity as the valve flapper is opened within the valve housing bore from a closed position. FIG. 5 sets forth a graph illustrating the gas flow characteristics of a typical butterfly valve versus a butterfly valve of this invention as a function of flow area and percent valve openness at constant inlet pressure conditions.

Figure 6A:
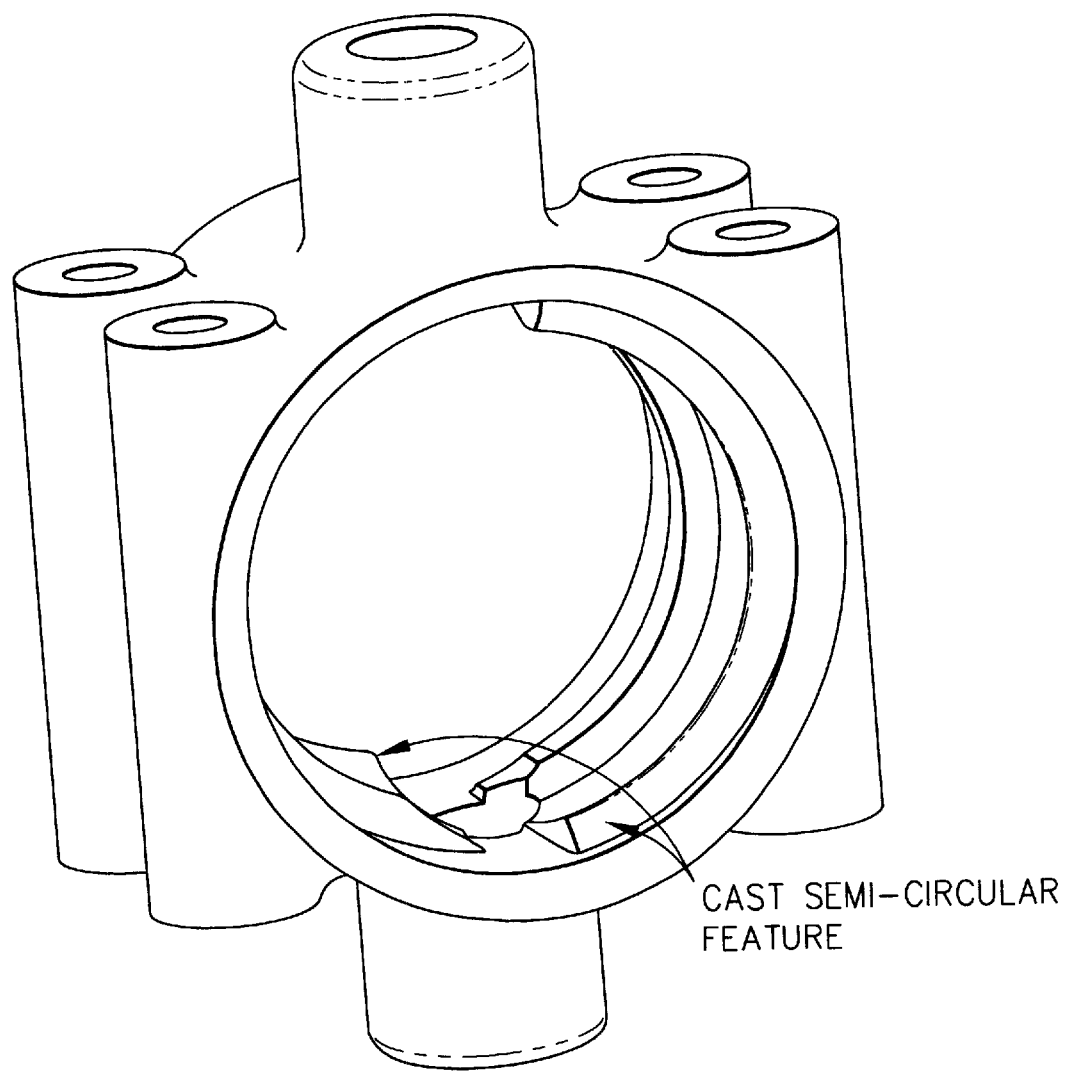
FIGS. 6A and 6B are photographs showing projections disposed within an inside diameter/bore of a butterfly valve housing constructed according to an embodiment of the present invention.
Figure 6B:
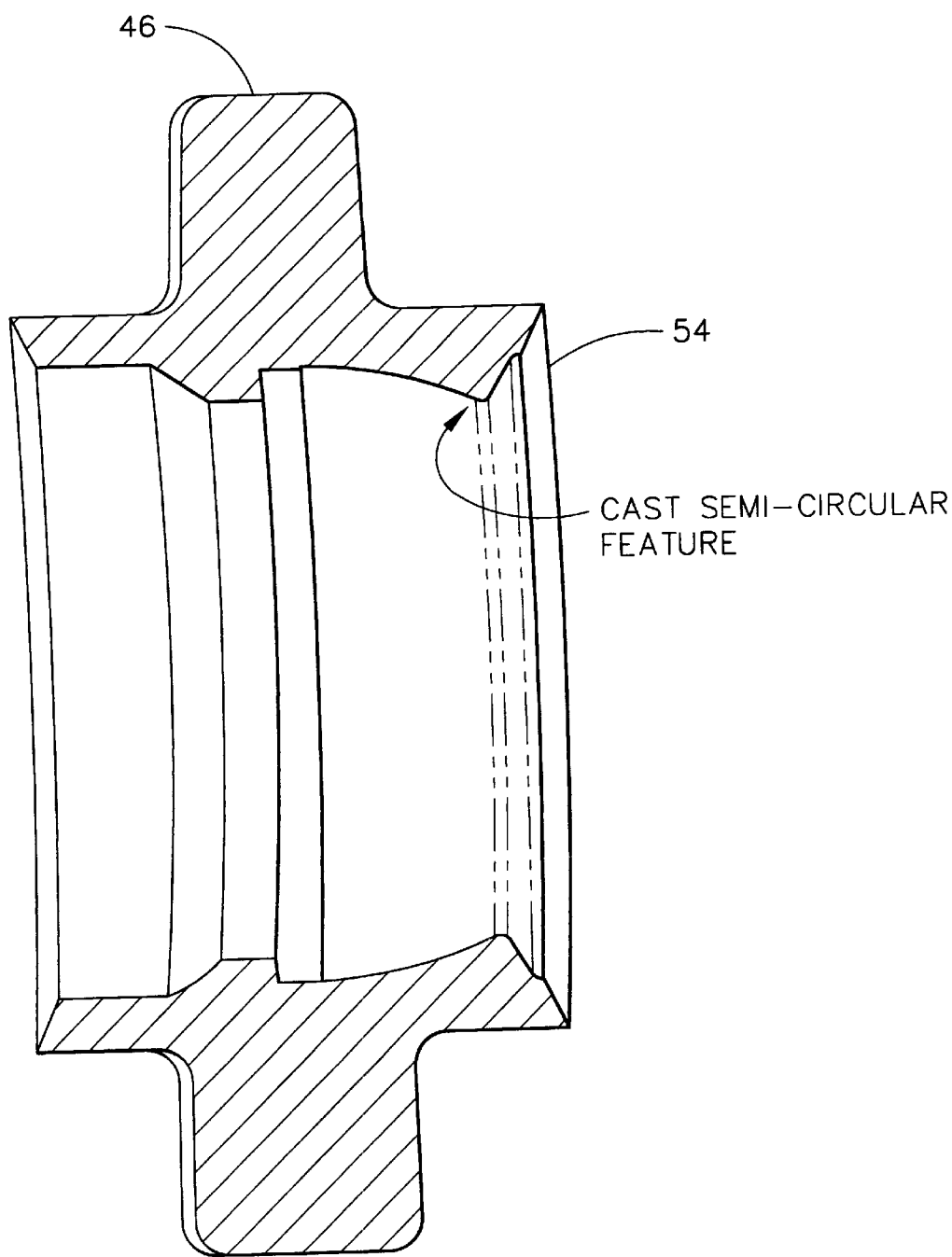

FIGS. 6A and 6B each illustrate the circular bore of a butterfly valve housing 40, and further illustrate the placement of the first, second, third, and fourth projections 46, 48, 54, 56 disposed therein. As mentioned above, the projections project radially inwardly into the bore and are positioned adjacent the butterfly valve to provide the desired valve operation and gas flow characteristics during valve opening movement. The housing bore projections can be made by net shape manufacturing methods (casting or other mold methods), or alternatively, can be made by machining process to yield the desired geometry.

Figure 7:
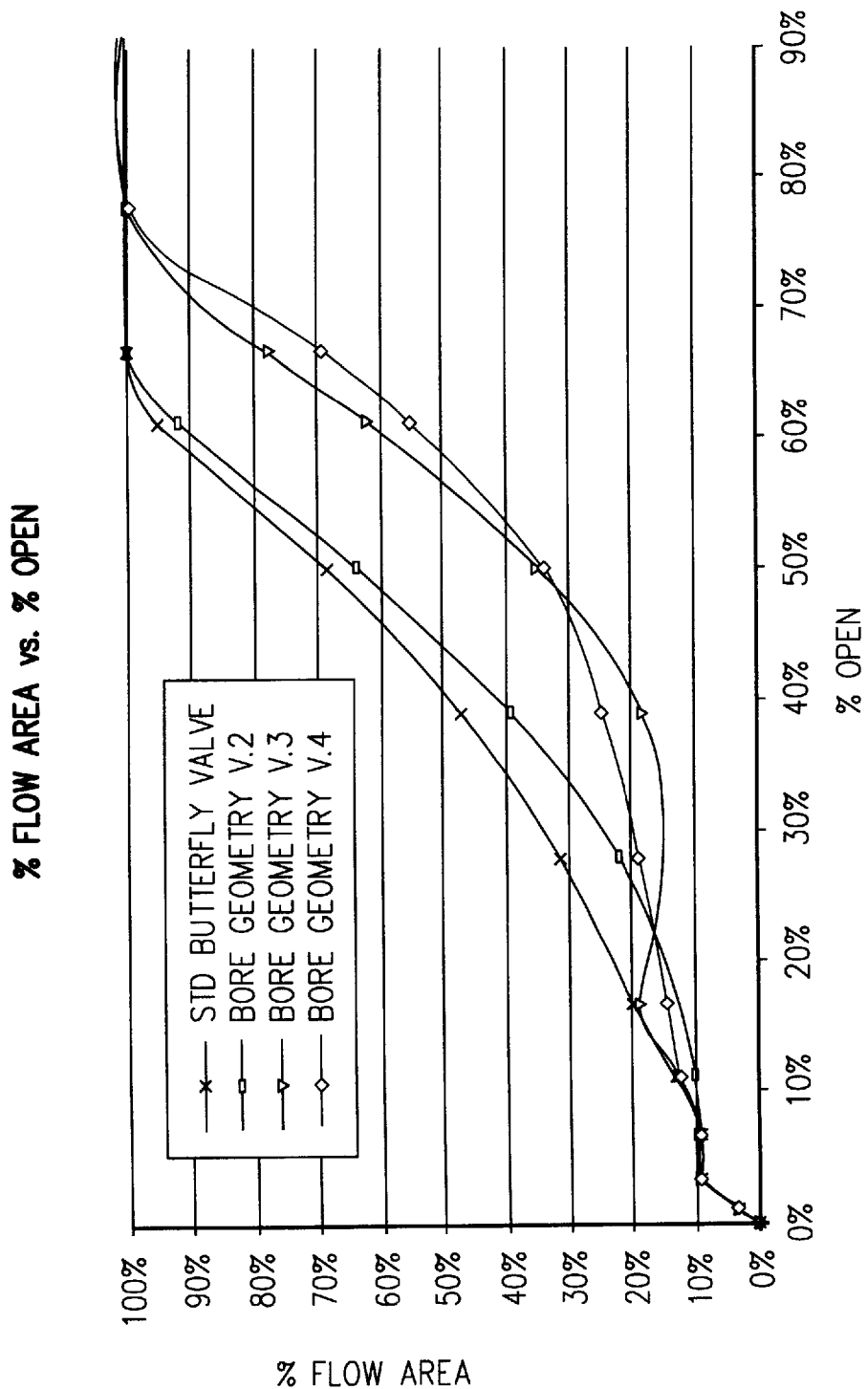
FIG. 7 is a graph illustrating butterfly valve flow characteristics for a traditional butterfly valves as compared to butterfly valves of this invention as a function of percent flow area and percent openness for different valve housing bore geometries constructed according to embodiments of the present invention.
Figure 8:
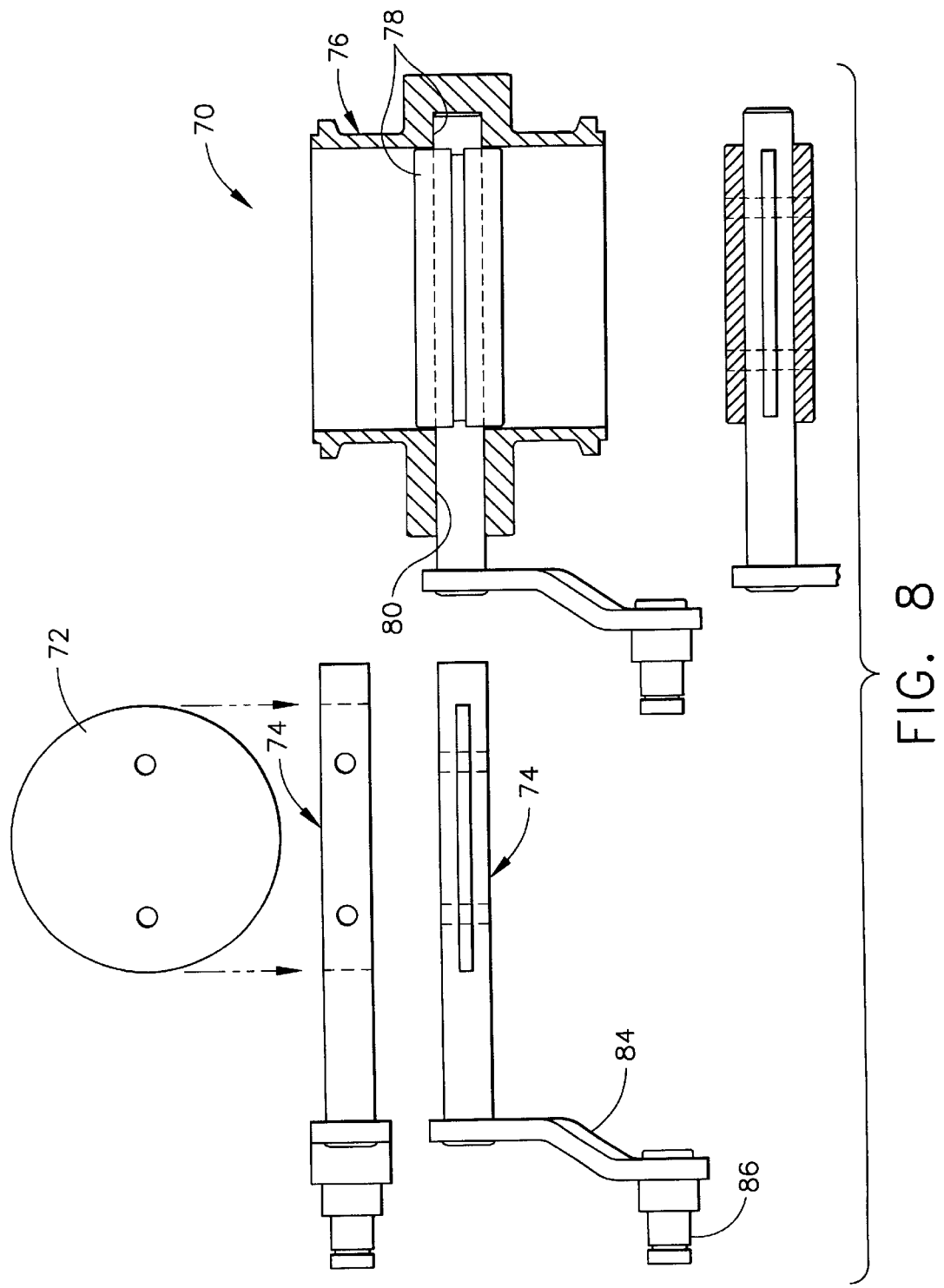
FIG. 8 is a schematic view of butterfly valve and related components constructed according to an embodiment of the present invention.

FIG. 7 sets forth a chart graphically illustrating gas flow characteristics, as a function of percent flow area and percent valve openness, as compared between a traditional butterfly valve and three differently sized butterfly valves of this invention. In each case, the graph demonstrates the improved (more gradual) gas flow control that is provided by the three butterfly embodiments of this invention at from 5 to 45 percent valve openness.

Butterfly valves of this invention can, also be configured to have an improved sealing ability (when placed into a closed position within the valve housing, and have a full 90 degrees of motion. The butterfly valve is configured to seat, not on an outer edge of the flapper, but rather on a face of the flapper against a protruding valve housing seal face or seat. Such butterfly valve preferably includes dual axle support (bushings on both sides) for stability. The flapper face seal provides an improved degree of sealing and leak resistance even in high exhaust pressure environments such as that found in a diesel engine.

FIGS. 8 to 12 illustrate a butterfly valve 70, constructed according to a second embodiment of the present invention, comprising the above-described face sealing arrangement. The butterfly valve 70 includes a generally circular flapper 72 that is coupled to an actuating shaft 74. The flapper can be a stamped part. The shaft 74 extends through a valve housing 76, and bushings 78 and 80 are interposed between the housing and shaft, and are position at each shaft end. The flapper 72 and shaft 74 are situated within the housing 76. One end of the shaft 74 is coupled to a actuating arm 84, that in turn is coupled to a pin 86. The bushings are used to provide accurate valve movement within the housing, which is useful to ensure proper interface between the cooperating valve flapper and housing seat surfaces during valve closure.

Figure 12:
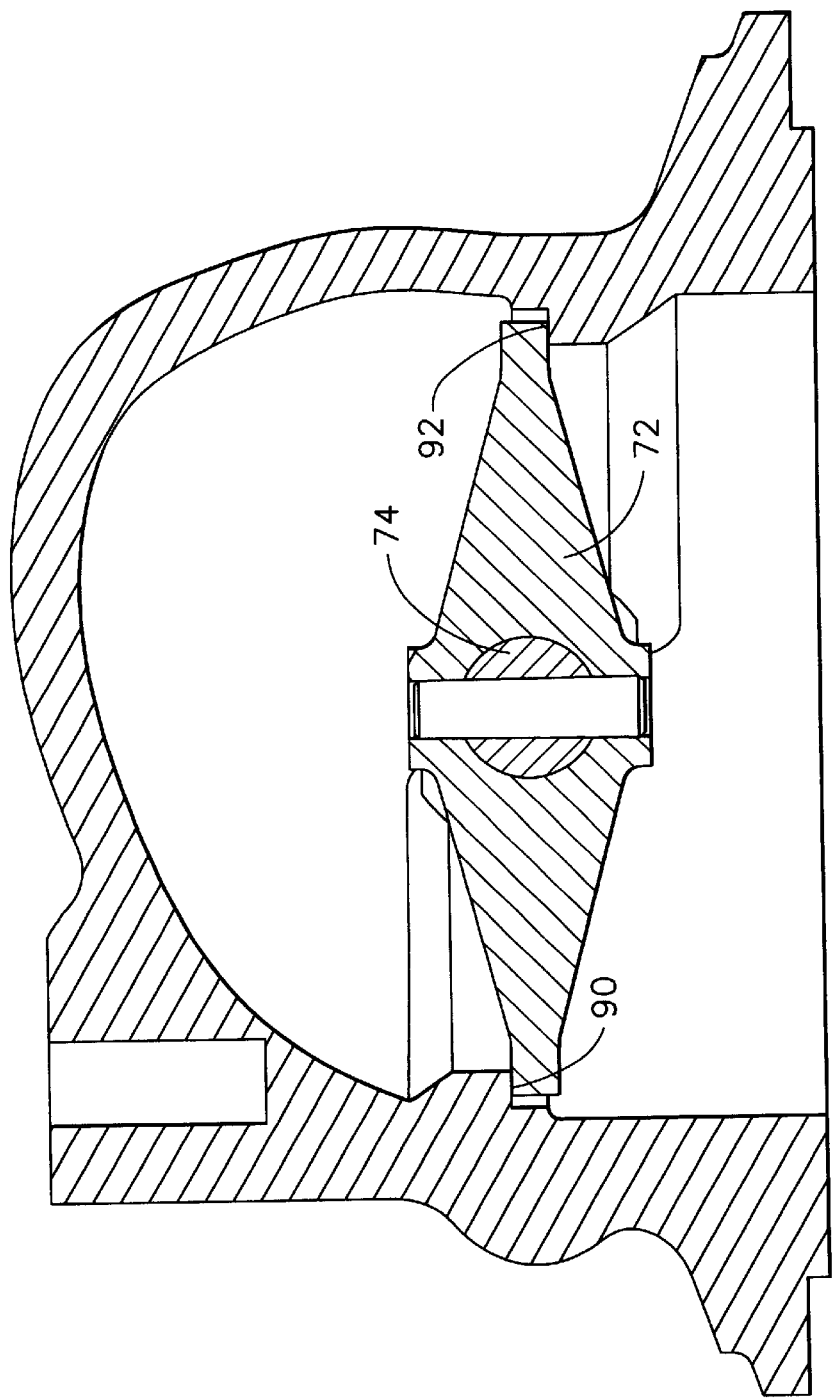
FIG. 12 is a cross-sectional view of an EGR butterfly valve assembly according to a second embodiment of the present invention taken along line B—B of FIG. 11.

FIG. 12 is useful for illustrating the face seal interface between the valve flapper 72 and the valve housing. Specifically, the valve housing is configured having a pair of diametrically opposed stepped seats 90 and 92 that each project inwardly a discrete distance into the housing, and that are configured having a face or seating surface that is perpendicular to an axis running through the housing, and that is parallel to the flapper when placed into a closed position. The stepped seats 90 and 92 are sized and positioned to cooperate with an adjacent portion of the flapper face adjacent the edge of the flapper when placed into a closed position. Configured in this manner, when placed into a closed position within the valve housing, contact between the adjacent flapper and stepped seat surfaces provide a desired seal therebetween.

Figure 13:
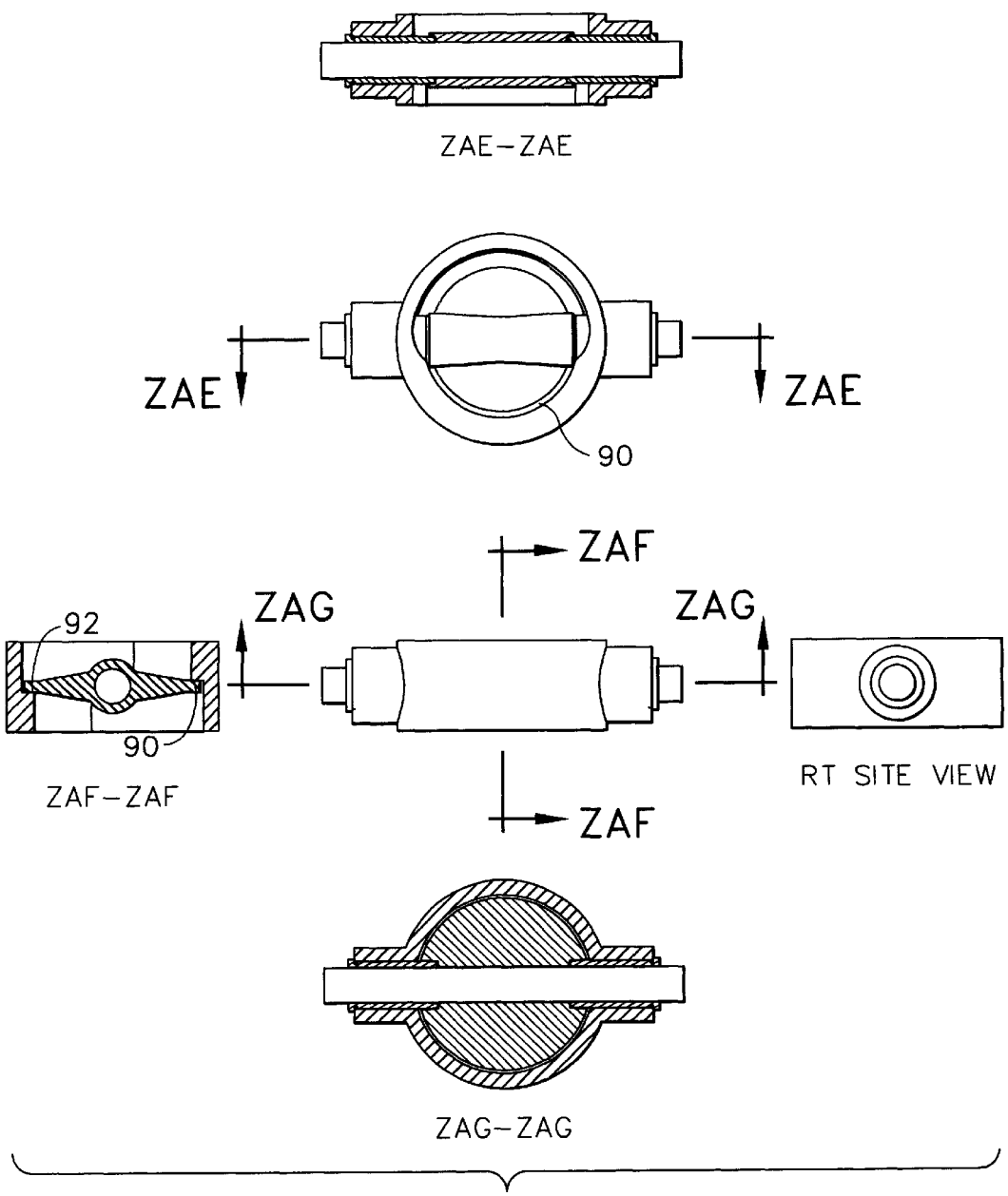
FIG. 13 is a compilation of several cross-sectional views of an EGR butterfly valve constructed according to a second embodiment of the present invention.
Figure 14:
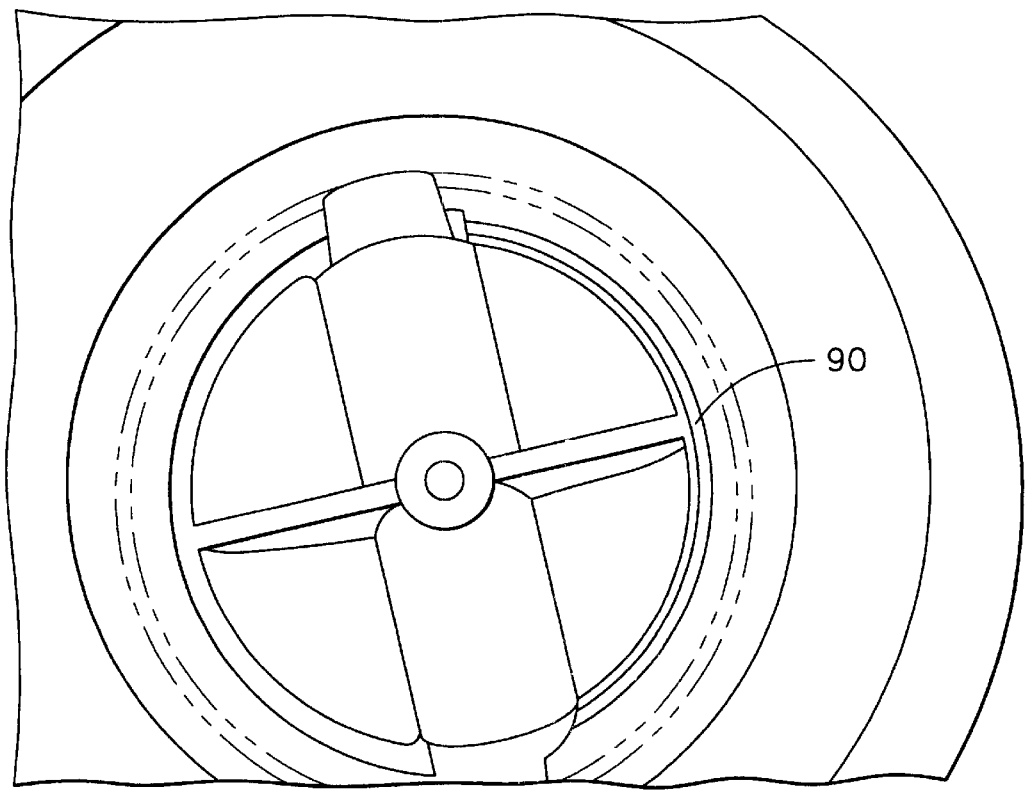
FIG. 14 is a photograph of an EGR butterfly valve assembly according to a second embodiment of the present invention.

FIG. 13 is a compilation of different views of a butterfly valve according to a second embodiment, illustrating the butterfly valve and valve housing elements described above. FIG. 14 is an end view of a butterfly valve according to the present invention, illustrating the manner in which the butterfly valve flapper is attached to the shaft. In this particular embodiment, the butterfly valve flapper is shown having a ridge that projects outwardly therefrom, and that extends diametrically across the flapper.

The butterfly valve 70 described above and illustrated in FIGS. 8 to 14 involves the use of a net shaped or a machined housing that contains the butterfly valve and the shaft/bushing components. As discussed above, the shaft is supported on both sides by the bushings for the purpose of providing increased stability. The stepped seal faces 90 and 92 in the housing may be machined directly from a non-net shaped housing or, alternatively, can be provided as a net shaped (i.e., a powdered metal or a metal injection molded) piece that is press fit or welded into the housing.

Butterfly valves and related valve housings of this invention van be configured having a tight overlapping clearances between elements to minimize or eliminate the potential for exhaust gas leakage outwardly from the valve to the external environment. In such valve embodiment, it is desired that a tight overlapping clearance exist between an internal component (valve arm or butterfly valve) and an external component (bushing), thereby creating a labyrinth path therebetween, Such a labyrinth path is desired because it provides an internal resistance for reducing the passage of high pressure therein, thereby helping to control the unwanted seepage of gas outwardly from the valve.

Figure 9:
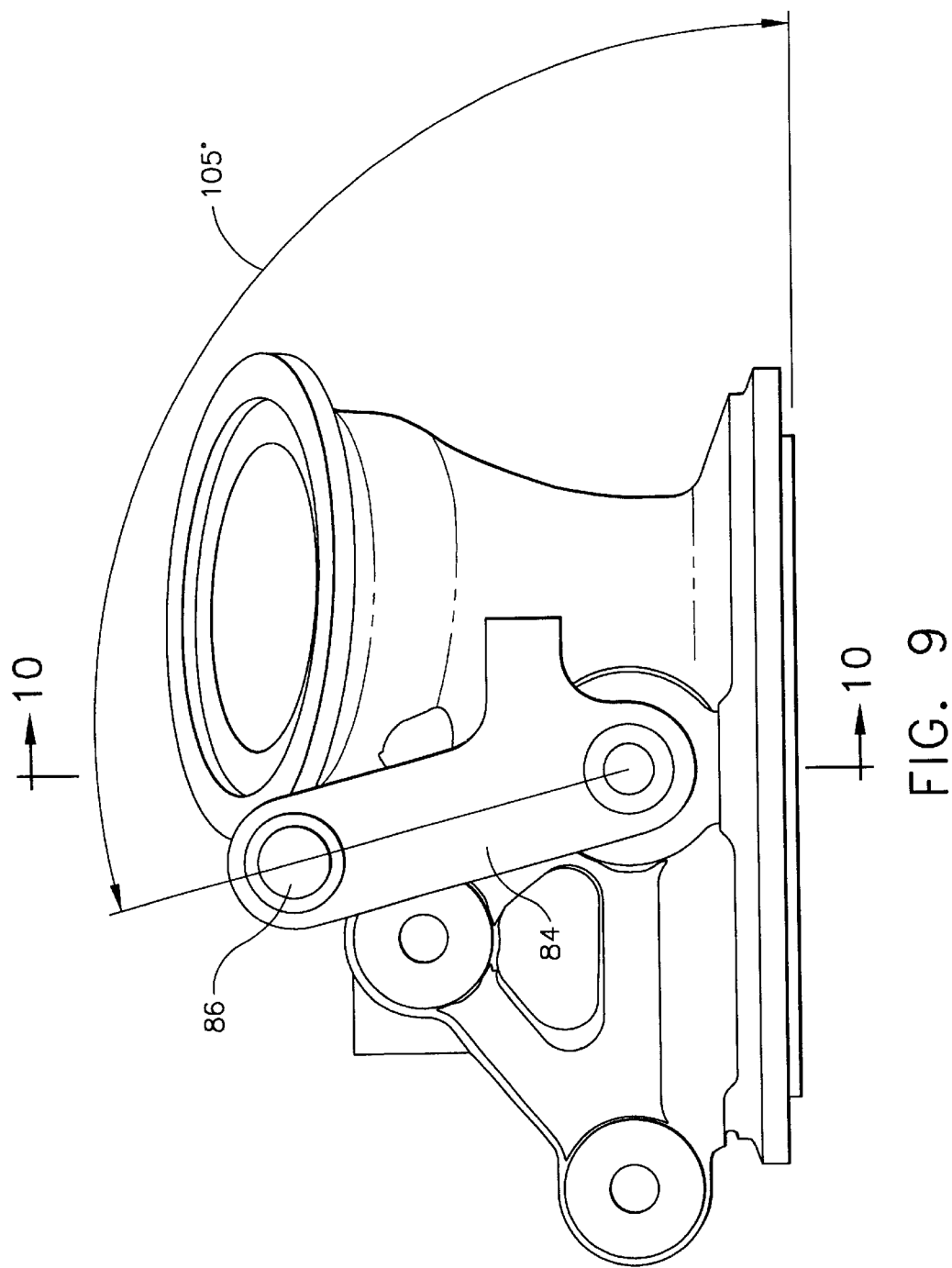
FIG. 9 is a schematic side view of an EGR butterfly valve assembly according to a second embodiment of the present invention.
Figure 10:
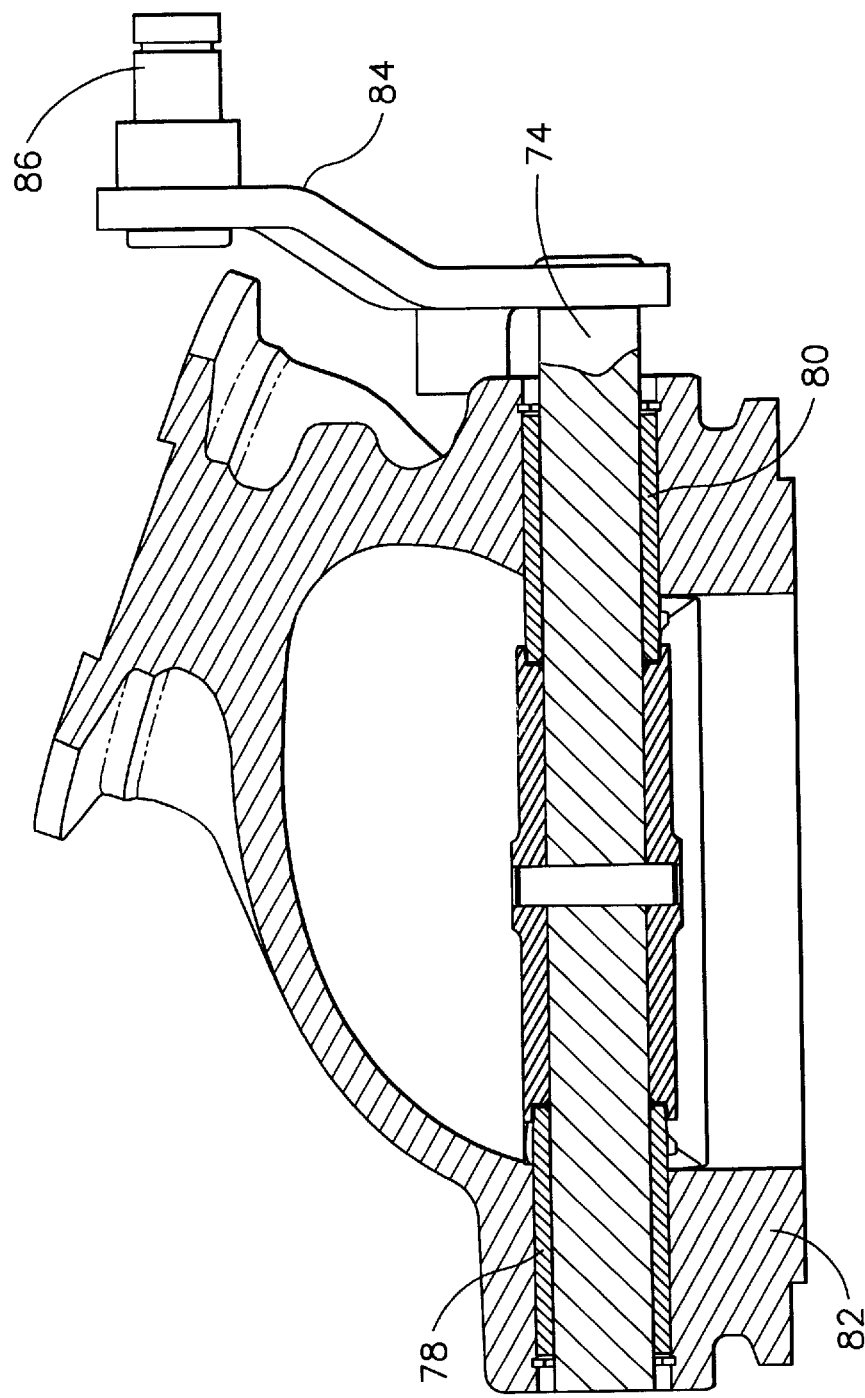
FIG. 10 is a cross-sectional view of an EGR butterfly valve assembly according to a second embodiment of the present invention taken along line A—A of FIG. 9.
Figure 11:
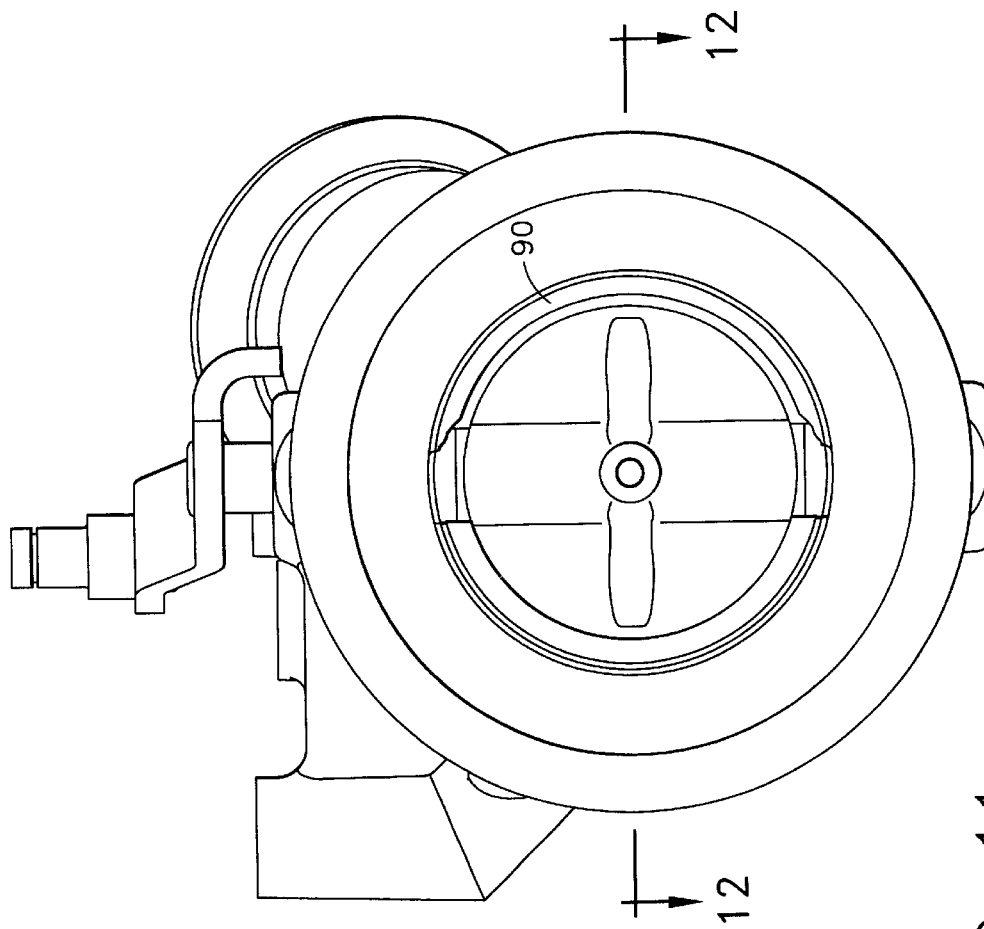
FIG. 11 is a top view of the EGR butterfly valve assembly illustrated in FIGS. 9 and 10.
Figure 15:
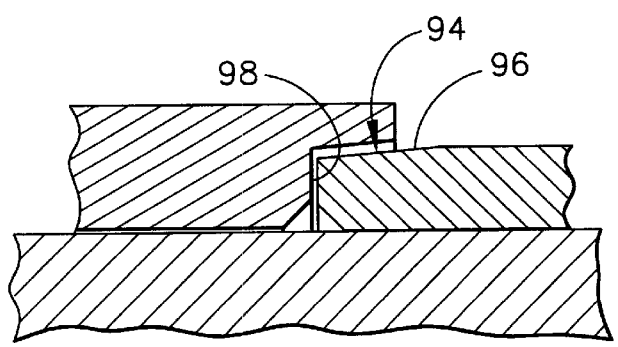
FIG. 15 is a cross-sectional view of an EGR butterfly valve assembly according to a third embodiment of the present invention.

Referring again to FIG. 8, a shaft 74 is coupled to an actuating arm 84. As shown in FIG. 9, the shaft 74 is round and the arm 84 has a circular hole that fits over and is secured to the shaft 74. In the butterfly valve embodiment of FIG. 15, a bushing 93 surrounds the shaft at a position along the shaft where it exits the valve housing. The bushing 93 projects outwardly with the shaft from within the housing 82, and extends axially along the shaft to the arm 84. The bushing 93 includes a first end 94 that is positioned adjacent the arm, and that is configured having a tapered or angled outer surface 96. The tapered outer surface 96 is configured and sized to fit into a circular groove 98 that is disposed into a joining surface of the arm 84. Configured in this manner, the bushing 93 and arm 84 are connected within one another to create a labyrinth path therebetween through which any exhaust gas exiting the valve housing must travel before escaping. This labyrinth path functions to prevent undesired leakage of gas from the valve.

The bushing angled portion 96 and the arm groove can be made by a net shape manufacturing method (i.e. casting, powdered metal, MIM). Alternatively, the bushing angled portion 96 and the arm groove can be made by machining a groove on the arm 84 that runs parallel (offset) at a tight clearance to the end contour of the bushing 93.

Butterfly valves and valve housings of this invention, as described above and illustrated in the referenced figures, are specially configured to: (1) provide an improved degree of gas flow control sensitivity at early open conditions through the use of specially configured flow control projections disposed within the valve housing and placed adjacent the valve flapper; and/or (2) provide an improved degree of internal valve sealability through the use of a face seal flapper and housing seat assembly; and/or (3) provide an improved resistance to external gas leakage through the use of a labyrinth path producing arrangement of cooperating valve members.

Having now described the invention in detail as required by the patent statutes, those skilled in the art will recognize modifications and substitutions to the specific embodiments disclosed herein, which modifications and substitutions are understood to be within the scope and intent of the present invention.

What is claimed is:

1. A butterfly valve assembly for use in an internal combustion engine exhaust gas recirculation system, the valve assembly comprising:
    a flapper having a terminal edge disposed circumferentially therearound;
    a valve housing having an annular and a central axis bore disposed therethrough, the flapper being rotatably positioned inside of the bore;
    a first projection disposed inside of the bore and projecting radially inwardly therefrom; and
    a second projection disposed inside of the bore and projecting radially inwardly therefrom;
    wherein the first and second projections are positioned at diametrically opposed positions relative to one another in the bore and extend axially in opposed directions within the bore in a direction of flapper opening movement
    and wherein the valve housing further comprises a second pair of projections that extend radially inwardly from the annular bore a defined distance from the diametrically opposed positions, and that are configured to make contact with diametrically opposed surfaces of the flapper when placed into a closed position.

2. The butterfly valve assembly as recited in claim 1 wherein the projections are sized and configured to provide a gradual increase in volumetric gas flow through the valve as the flapper is moved from a closed position to a partially opened position.

3. A butterfly valve assembly for use in an internal combustion engine exhaust gas transport system, the valve assembly comprising:
    a valve flapper having a first surface and an opposed second surface;
    a valve housing having an annular bore extending therethrough, the flapper being rotatably positioned inside of the bore;
    a shaft attached to the flapper and disposed through the valve housing bore;
    one or more bushings surrounding the shaft and interposed between the shaft and the housing, wherein the bushing extends outwardly from the housing;
    an actuator arm attached to a shaft end located outside of the valve housing; and
    means for forming a seal between bushing and the actuator arm.

4. The butterfly valve as recited in claim 3 wherein the means for sealing comprises a cooperating attachment formed between the adjacent surfaces of the bushing and actuator arm.

5. The butterfly valve as recited in claim 4 wherein the actuator arm bushing includes a circular groove disposed within a surface adjacent the bushing, and the bushing is configured having an end portion that fits into the groove.

6. The butterfly valve as recited in claim 4 wherein the valve housing includes:
    a first projection positioned inside of the bore and having a face positioned to contact a portion of the flapper first surface;
    a second projection positioned inside of the bore at a diametrically opposed position from the first projection, and having a face positioned to contact the flapper second surface; and
    wherein the flapper first and second surfaces make contact with the respective first and second projection faces when the flapper is rotated to a closed position within the housing to seal off gas flow within the bore.

* * * * *